(12) United States Patent
Simpson

(10) Patent No.: US 11,320,608 B1
(45) Date of Patent: May 3, 2022

(54) METAL COATED SPIKE ARRAY

(71) Applicant: Waymo LLC, Mountain View, CA (US)

(72) Inventor: John Simpson, Sahuarita, AZ (US)

(73) Assignee: Waymo LLC, Mountain View, CA (US)

( * ) Notice: Subject to any disclaimer, the term of this patent is extended or adjusted under 35 U.S.C. 154(b) by 0 days.

(21) Appl. No.: 17/023,670

(22) Filed: Sep. 17, 2020

(51) Int. Cl.
| | |
|---|---|
| *H01J 1/304* | (2006.01) |
| *H01J 1/312* | (2006.01) |
| *H01J 1/54* | (2006.01) |
| *G02B 6/42* | (2006.01) |
| *G02B 6/245* | (2006.01) |
| *G02B 6/24* | (2006.01) |
| *G01Q 60/22* | (2010.01) |
| *G01Q 20/02* | (2010.01) |

(52) U.S. Cl.
CPC .......... *G02B 6/4203* (2013.01); *G01Q 20/02* (2013.01); *G01Q 60/22* (2013.01); *G02B 6/241* (2013.01); *G02B 6/245* (2013.01); *H01J 1/304* (2013.01); *H01J 1/312* (2013.01); *H01J 1/54* (2013.01)

(58) Field of Classification Search
CPC .............. H01J 1/304; H01J 1/312; H01J 1/54
See application file for complete search history.

(56) References Cited

U.S. PATENT DOCUMENTS

| | | |
|---|---|---|
| 5,294,790 A | 3/1994 | Ohta et al. |
| 5,812,724 A | 9/1998 | Ohtsu et al. |
| 5,928,525 A | 7/1999 | Ohtsu et al. |
| 6,236,783 B1 | 5/2001 | Mononobe et al. |
| 6,393,185 B1 | 5/2002 | Deacon |
| 6,813,402 B2 | 11/2004 | Narita et al. |
| 7,150,904 B2 | 12/2006 | D'Urso et al. |
| 7,586,085 B2 | 9/2009 | Ohtsu et al. |
| 2008/0080816 A1 | 4/2008 | D'Urso et al. |
| 2011/0235658 A1 | 9/2011 | Pocholle et al. |

(Continued)

FOREIGN PATENT DOCUMENTS

DE      4106548 C2      5/1994

OTHER PUBLICATIONS

Flores et al., "Design and analysis of fiber optical distance sensor," Proceedings of SPIE—The International Society for Optical Engineering, Aug. 2005, pp. 58750P-1-58750P-8.

*Primary Examiner* — Joseph L Williams
(74) *Attorney, Agent, or Firm* — McDonnell Boehnen Hulbert & Berghoff LLP

(57) ABSTRACT

An article of manufacture includes a support structure including a cladding material and defining therein a plurality of substantially parallel cores. The article also includes a plurality of conically-shaped spikes protruding from a first side of the support structure. Each respective conically-shaped spike of the plurality of conically-shaped spikes includes a core material (i) extending through a corresponding core of the plurality of substantially parallel cores and (ii) comprising an axial protrusion that protrudes axially from the cladding material at the first side of the support structure. The axial protrusion of the core material is tapered to form the respective conically-shaped spike. The article also includes a refractory metal layer coating at least a portion of each respective conically-shaped spike and one or more electrodes connected to the refractory metal layer and configured to apply a voltage to the refractory metal layer.

20 Claims, 9 Drawing Sheets

(56) References Cited

U.S. PATENT DOCUMENTS

| | | |
|---|---|---|
| 2012/0227263 A1 | 9/2012 | Leclair et al. |
| 2015/0168702 A1 | 6/2015 | Harris |
| 2018/0238806 A1 | 8/2018 | Zhang et al. |
| 2021/0263070 A1 | 8/2021 | Janunts |

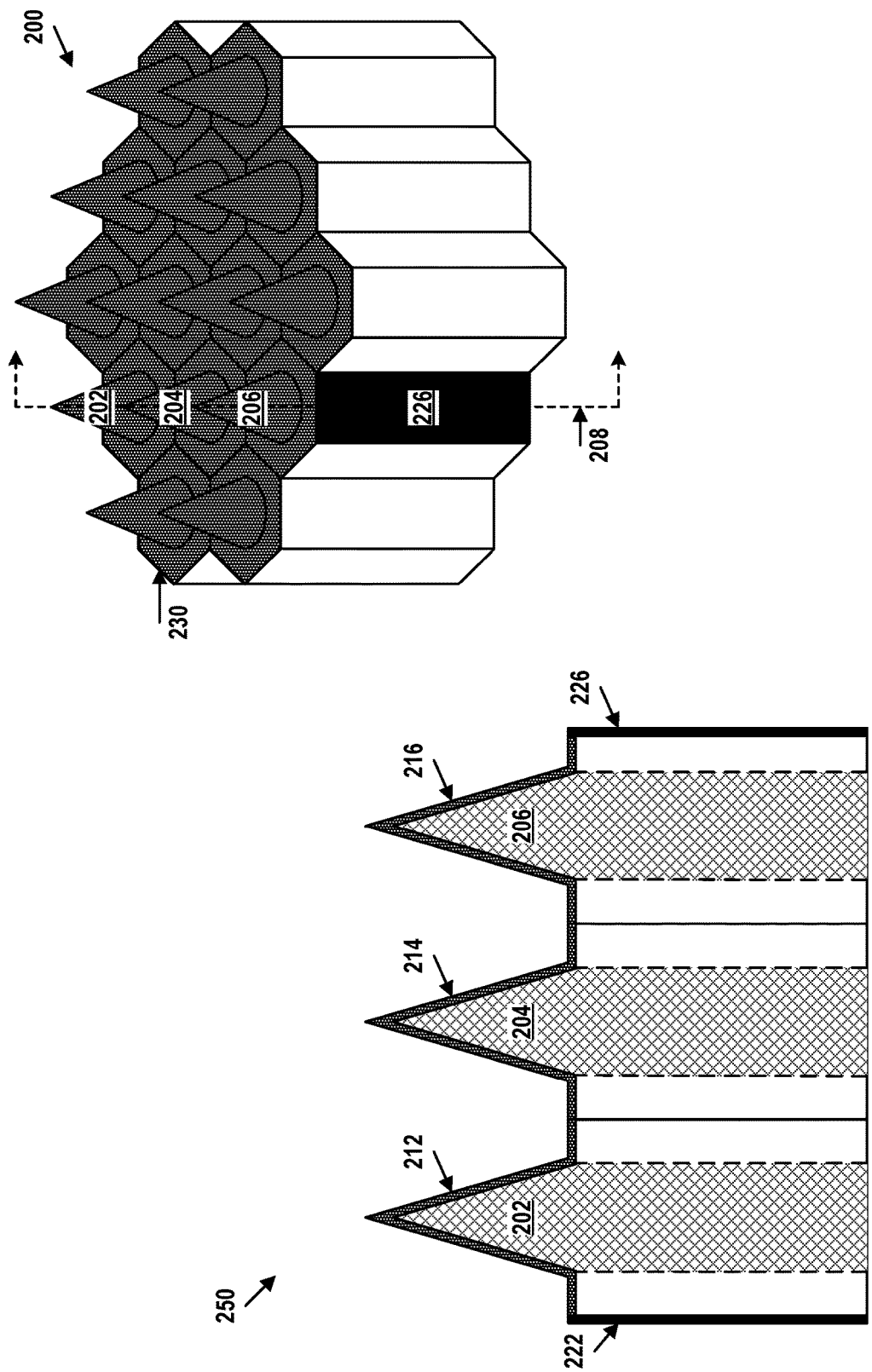

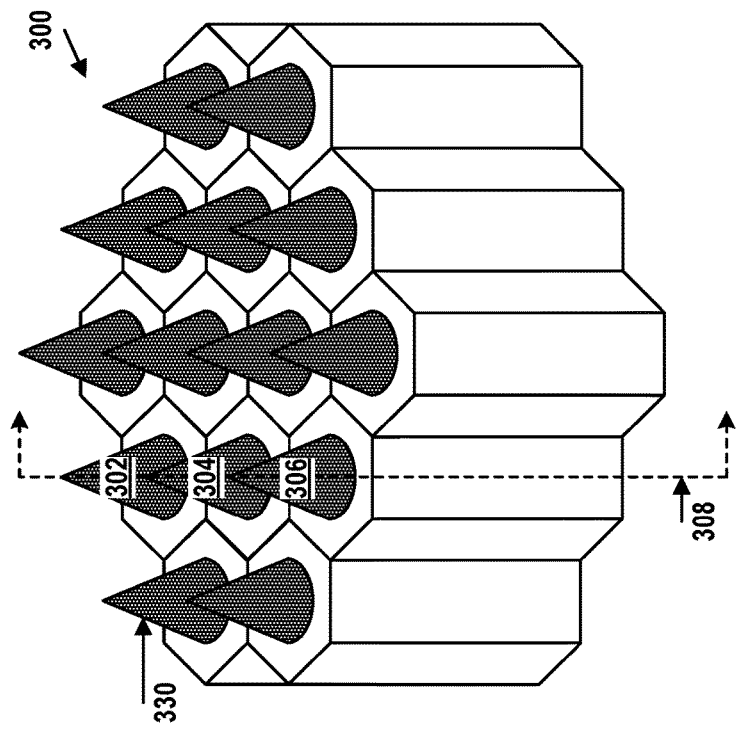
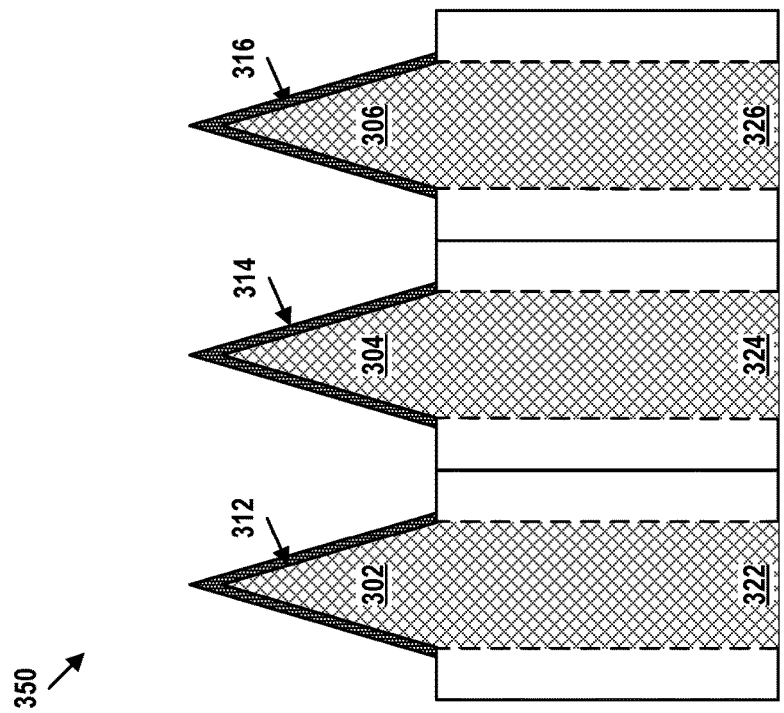
Figure 3

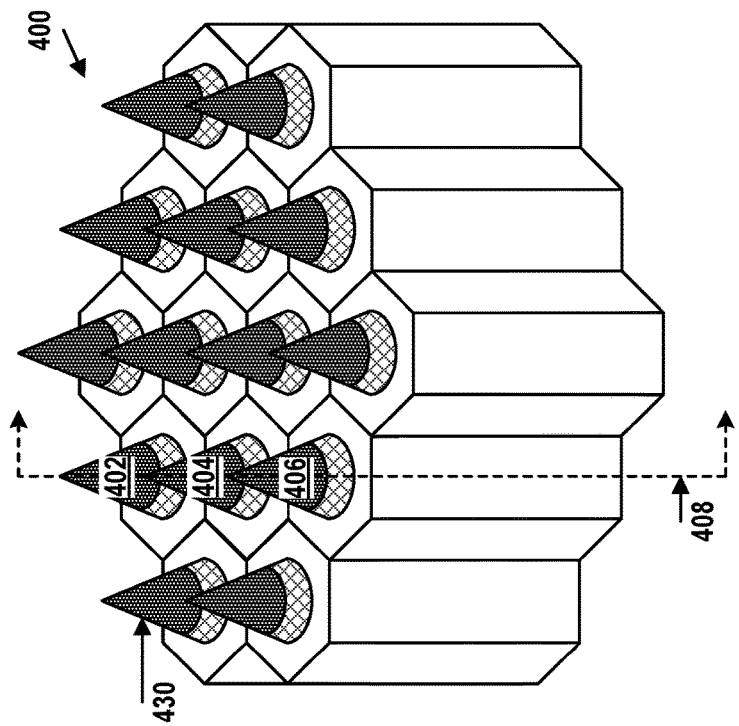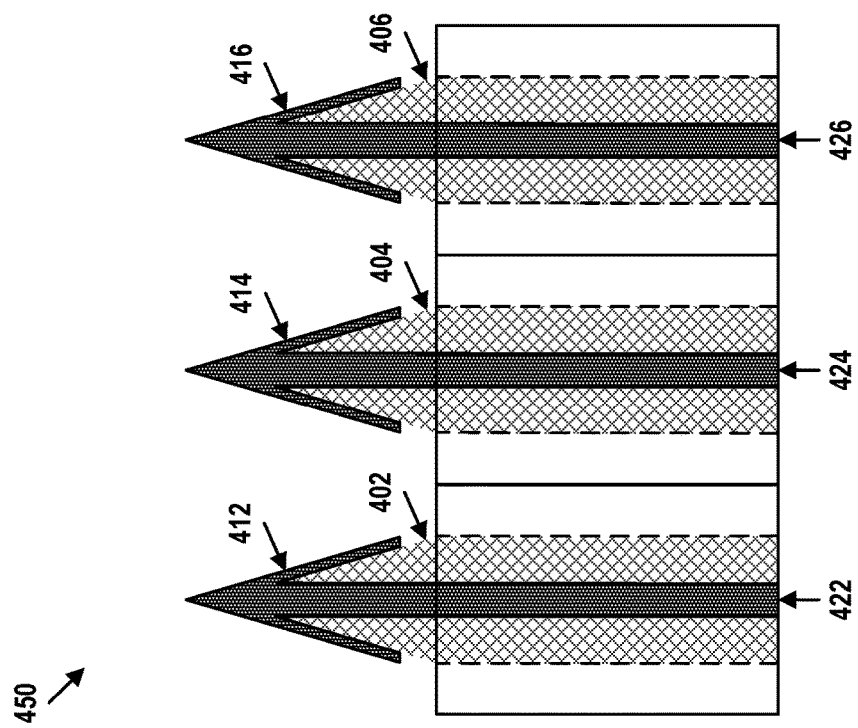
Figure 4

APPLY, BY ONE OR MORE VOLTAGE SOURCES, A VOLTAGE TO AN ARRAY OF ELECTRON EMISSION TIPS BY WAY OF ONE OR MORE ELECTRODES CONNECTED TO A REFRACTORY METAL LAYER OF THE ARRAY OF ELECTRON EMISSION TIPS, WHEREIN THE ARRAY OF ELECTRON EMISSION TIPS COMPRISES A SUPPORT STRUCTURE COMPRISING A CLADDING MATERIAL AND DEFINING THEREIN A PLURALITY OF SUBSTANTIALLY PARALLEL CORES AND A PLURALITY OF CONICALLY-SHAPED SPIKES PROTRUDING FROM A FIRST SIDE OF THE SUPPORT STRUCTURE, WHEREIN EACH RESPECTIVE CONICALLY-SHAPED SPIKE OF THE PLURALITY OF CONICALLY-SHAPED SPIKES COMPRISES A CORE MATERIAL (I) EXTENDING THROUGH A CORRESPONDING CORE OF THE PLURALITY OF SUBSTANTIALLY PARALLEL CORES AND (II) COMPRISING AN AXIAL PROTRUSION THAT PROTRUDES AXIALLY FROM THE CLADDING MATERIAL AT THE FIRST SIDE OF THE SUPPORT STRUCTURE, WHEREIN THE AXIAL PROTRUSION OF THE CORE MATERIAL IS TAPERED TO FORM THE RESPECTIVE CONICALLY-SHAPED SPIKE, AND WHEREIN THE REFRACTORY METAL LAYER COATS AT LEAST A PORTION OF EACH RESPECTIVE CONICALLY-SHAPED SPIKE

DETECT, BY AN ELECTRON DETECTOR, ELECTRONS EMITTED BY THE ARRAY OF ELECTRON EMISSION TIPS

Figure 8

METAL COATED SPIKE ARRAY

BACKGROUND

Controlled emission of electrons may be used in a variety of applications to achieve desirable effects. In the context of microscopy, for example, measurements of electron reflection, transmission, scattering, absorption, and/or tunneling may be used for determining one or more physical properties of a sample. In the context of displays, various phosphors configured to emit light when struck by an electron may be used in combination with one or more electron emitters to cause an image to be displayed.

SUMMARY

A spike array may be coated with a refractory metal layer. The metal-coated spike array may be used in a variety of applications to emit electrons. The spike array may be formed from an array of fibers each including a core material and a cladding material surrounding the core. The array of fibers may be fused together and drawn one or more times to achieve a desired length, surface area, fiber diameter, and/or another target dimension. The array of fibers may be etched to form a plurality of conically-shaped spikes on one side of the array of fibers, with the spikes "pointing" (e.g., tapering down) along an axial direction of the fibers. The conically-shaped spikes then may be coated with the refractory metal layer, and one or more electrodes may be used to apply a voltage to the refractory metal layer to induce emission of electrons by one or more of the conically-shaped spikes. The array of metal-coated spikes may be used, for example, as part of a field emission microscope system, an electron tunneling microscope system, and/or a di splay system, among other applications.

In a first example embodiment, an article of manufacture may include a support structure that includes a cladding material and defines therein a plurality of substantially parallel cores. The article of manufacture may also include a plurality of conically-shaped spikes protruding from a first side of the support structure. Each respective conically-shaped spike of the plurality of conically-shaped spikes may include a core material (i) extending through a corresponding core of the plurality of substantially parallel cores and (ii) including an axial protrusion that protrudes axially from the cladding material at the first side of the support structure. The axial protrusion of the core material may be tapered to form the respective conically-shaped spike. The article of manufacture may additionally include a refractory metal layer coating at least a portion of each respective conically-shaped spike. The article of manufacture may further include one or more electrodes connected to the refractory metal layer and configured to apply a voltage to the refractory metal layer.

In a second example embodiment, a system may include an array of electron emission tips. The array of electron emission tips may include a support structure that includes a cladding material and defines therein a plurality of substantially parallel cores. The array of electron emission tips may also include a plurality of conically-shaped spikes protruding from a first side of the support structure. Each respective conically-shaped spike of the plurality of conically-shaped spikes may include a core material (i) extending through a corresponding core of the plurality of substantially parallel cores and (ii) including an axial protrusion that protrudes axially from the cladding material at the first side of the support structure. The axial protrusion of the core material may be tapered to form the respective conically-shaped spike. The array of electron emission tips may further include a refractory metal layer coating at least a portion of each respective conically-shaped spike. The system may also include one or more voltage sources connected to the refractory metal layer of the array of electron emission tips by way of one or more electrodes and configured to apply a voltage to the refractory metal layer. The system may further include an electron detector configured to detect electrons emitted by the array of electron emission tips.

In a third example embodiment, a method may include applying, by one or more voltage sources, a voltage to an array of electron emission tips by way of one or more electrodes connected to a refractory metal layer of the array of electron emission tips. The array of electron emission tips may include a support structure that includes a cladding material and defines therein a plurality of substantially parallel cores. The array of electron emission tips may also include a plurality of conically-shaped spikes protruding from a first side of the support structure. Each respective conically-shaped spike of the plurality of conically-shaped spikes may include a core material (i) extending through a corresponding core of the plurality of substantially parallel cores and (ii) including an axial protrusion that protrudes axially from the cladding material at the first side of the support structure. The axial protrusion of the core material may be tapered to form the respective conically-shaped spike. The refractory metal layer may coat at least a portion of each respective conically-shaped spike. The method may also include detecting, by an electron detector, electrons emitted by the array of electron emission tips.

In a fourth example embodiment, a system may include an electron emission means. The electron emission means may include a support structure that includes a cladding material and defines therein a plurality of substantially parallel cores. The electron emission means may also include a plurality of conically-shaped spikes protruding from a first side of the support structure. Each respective conically-shaped spike of the plurality of conically-shaped spikes may include a core material (i) extending through a corresponding core of the plurality of substantially parallel cores and (ii) including an axial protrusion that protrudes axially from the cladding material at the first side of the support structure. The axial protrusion of the core material may be tapered to form the respective conically-shaped spike. The electron emission means may further include a refractory metal layer coating at least a portion of each respective conically-shaped spike. The system may also include one or more means for applying a voltage to the refractory metal layer. The system may further include means for detecting electrons emitted by the electron emission means.

These, as well as other embodiments, aspects, advantages, and alternatives, will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

BRIEF DESCRIPTION OF THE DRAWINGS

FIG. 2 illustrates a metal-coated spike array, in accordance with example embodiments.

FIG. 3 illustrates a metal-coated spike array, in accordance with example embodiments.

FIG. 4 illustrates a metal-coated spike array, in accordance with example embodiments.

FIG. 8 illustrates a flow chart, in accordance with example embodiments.

DETAILED DESCRIPTION

Figure 1A:
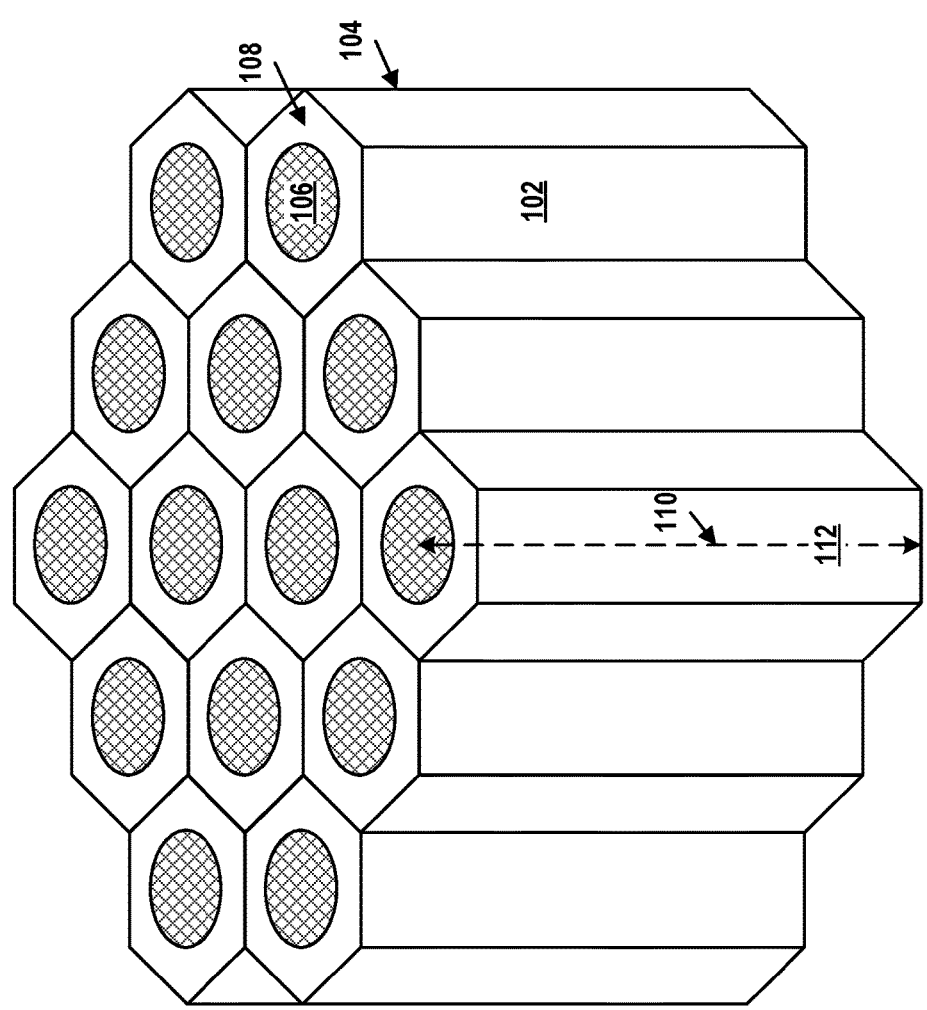
FIG. 1A illustrates a fiber array, in accordance with example embodiments.

Example methods, devices, and systems are described herein. It should be understood that the words "example" and "exemplary" are used herein to mean "serving as an example, instance, or illustration." Any embodiment or feature described herein as being an "example," "exemplary," and/or "illustrative" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order. Unless otherwise noted, figures are not drawn to scale.

I. Overview

An array of a plurality of conically-shaped spikes may be made from a bundle of a plurality of glass fibers. In one example, each glass fiber may include a circular core material surrounded by a cladding material. The outside of the cladding material may be circular or hexagonal, among other possibilities. When the bundle of glass fibers is fused together, the cladding material may define a support structure of the array. Specifically, to form the array, the glass fibers may be bundled into an array with the axes aligned side by side. The bundle may be stretched axially while being heated to fuse the fibers and reduce their respective diameters. The stretched array may then be cut perpendicularly to the glass fiber axes, and the process may be repeated with respect to the stretched and cut glass fiber array until the individual glass fibers are reduced to a desired size. With each iteration of bundling, stretching, and cutting, the diameter of the glass fibers may be reduced, but the aspect ratio of the core material to the cladding material may remain substantially constant.

Upon achieving an array of glass fibers having the desired size, at least one face of the array perpendicular to the axes of the glass fibers may be etched to create the conically-shaped spikes. Specifically, the core material and the cladding material may have different etching rates when subjected to an etchant, with an etching rate of the cladding material being greater than an etching rate of the core material. Thus, as the face of the array is exposed to the etchant, the cladding material may be removed at a higher rate than the core material, resulting in the core material being shaped into a substantially conical spike. The aspect ratio of the spike (e.g., the ratio of the height of the cone to a radius of the cone) may be based on the ratio of the etching rate of the cladding material to the etching rate of the core material. Thus, the aspect ratio of the spike may be controlled through selection of a particular combination of cladding material, core material, and/or etchant. In some cases, the resulting plurality of conically-shaped spikes may be atomically-sharp.

The array of the conically-shaped spikes may be coated with a layer of a refractory metal such as Niobium (Nb), Molybdenum (Mo), Tantalum (Ta), Tungsten (W), or Rhenium (Re). In cases where the conically-shaped spikes are atomically sharp, a radius of curvature of a particular conically-shaped spike after coating with the refractory metal may be substantially equal to a thickness of the refractory metal layer. For example, an atomically-sharp conically-shaped spike coated with a 10 nanometer layer of Tungsten may have a radius of curvature equal to 10 nanometers at the tip, plus or minus some variation due to the metal deposition process. Thus, coating of the conically-sharp spikes with a refractory metal may allow for manufacture of a much finer metal tip (i.e., a tip having a smaller radius of curvature) than might be possible through conventional methods.

One or more electrodes may be connected to the refractory metal layer to allow for application of a voltage to the refractory metal layer. The electrodes may include any conductive structures configured to connect the refractory metal layer to a voltage source, current source, or other electrical component. For example, the electrodes may include metal leads/wires/traces or conductive glass, among other possibilities. In some implementations, the electrodes may be routed through the support structure. For example, each electrode may run axially through the core material (and thus also through the cladding material, which may be electrically non-conductive) from a second side of the array (e.g., a side lacking conically-shaped cone spikes) to a first side of the array from which the conically-shaped spikes protrude. In some cases, the core material itself may be electrically conductive and thus define and/or include at least a portion of the electrodes.

In some implementations, the refractory metal layer may form a continuous coat over the plurality of conically-shaped spikes. That is, the entirety of the first side of the array, including the conically-shaped spikes and regions of exposed cladding material therebetween, may be coated with the refractory metal, resulting in each conically-shaped spike being electrically connected to all other conically-shaped spikes in the array. Thus, a single electrode may be sufficient to apply a voltage to the array.

In other implementations, the refractory metal layer may form a discontinuous coat over the plurality of conically-shaped spikes. Thus, groups of one or more conically-shaped spikes may be electrically isolated from one another. For example, at least a portion of each conically-shaped spike may be coated with the refractory metal, but the regions of exposed cladding material between adjacent conically-shaped spikes might not be coated with the refractory metal. In another example, each conically-shaped spike in a group of two or more conically-shaped spikes may be coated with the refractory metal, and regions of exposed cladding material between different conically-shaped spikes within a given group may be coated with the refractory metal, but the regions of exposed cladding material between different groups might not be coated with the refractory metal. Each conically-shaped spike or group thereof may be independently addressable by way of a corresponding electrode, thus allowing for spatial control of the voltage across the area of the array.

In one example, the conically-shaped spikes may be disposed in an electric field. Thus, applying the voltage to the refractory metal layer may induce emission of electrons from the plurality of conically-shaped spikes. Accordingly, the conically-shaped spikes coated with the refractory metal layer may be used as field emission tips of a scanning electron microscope, Alternatively, the conically-shaped spikes coated with the refractory metal layer may be used as electron sources for a display system.

The refractory metal layer may be resistant to degradation and wear as electrons are emitted therefrom over time. Additionally, since the array includes a plurality of conically-shaped spikes, emissions of a few electrons per spike may be sufficient to collectively generate a large field emission current, resulting in each spike undergoing less degradation with use. The electron beam generated by the array of conically-shaped spikes may be wider and thus have an inherently lower dispersion than a narrower electron beam generated by a single field emission tip. Further, since the conically-shaped spikes may be atomically sharp and the refractory metal layer may be very thin, electron emission may be achieved at relatively low voltages. In general, a thinner layer of refractory metal may be used to achieve electron emission at a lower voltage, while a thicker layer of the refractory metal may provide improved conductivity and durability of the refractory metal layer tip.

In another example, positioning the refractory metal layer in close proximity to a sample and applying a voltage between the sample and the refractory metal layer may induce tunneling of electrons between the sample to the plurality of conically-shaped spikes. Accordingly, the conically-shaped spikes coated with the refractory metal layer may be used as probes of an electron tunneling microscope. Since the array includes a plurality of conically-shaped spikes, each functioning as an individual probe, the entire sample may be scanned with little to no movement of the array. Specifically, the area of the array of conically-shaped spikes can be increased by the addition of more glass fibers to the bundle, and may thus be made large enough to span the entire sample. Further, the spacing between adjacent conically-shaped spikes may be decreased by drawing the glass fiber bundles more times to decrease the diameter of each glass fiber, thereby improving the resolution of the array in a horizontal direction along the sample surface.

Coating the array of conically-shaped spikes with the refractory metal layer may allow for creation of an array of sharp refractory metal spikes using established glass fiber drawing processes. Specifically, the refractory metal layer may be deposited onto the array of conically-shaped spikes without drawing, stretching, and/or deforming the metal itself as part of the drawing process. Notably, using the refractory metal in place of the core material (rather than depositing a refractory metal layer thereon) might not be a feasible alternative for creating a similar array of conically-shaped spikes due to the high melting point and hardness of refractory metals. Specifically, the temperature and/or forces needed to draw a refractory metal into fibers of increasingly smaller diameter might exceed the temperature and/or forces with which the cladding material is compatible, thus making it difficult, inconvenient, expensive, and/or infeasible to manufacture the conically-shaped spikes directly from the refractory metal. For example, the cladding material might melt before the refractory metal core is heated to a temperature sufficiently high to allow for stretching of the refractory metal core.

II. Example Array of Conically-Shaped Spikes

FIG. 1A illustrates glass fiber array 100 that includes a plurality of glass fibers. Glass fiber array 100 may alternatively be referred to as a glass fiber bundle. Glass fiber array 100 includes fourteen substantially identical glass fibers. In other implementations, more or fewer glass fibers may be used to form glass fiber array 100. Aspects of glass fiber 102, positioned at the bottom right portion of glass fiber array 100, and glass fiber 112, positioned at the bottom center of glass fiber array 100, are discussed herein as representative examples of the glass fibers in glass fiber array 100.

Glass fiber 102 may include core 106 surrounded by cladding 104. Core 106 may be alternatively referred to herein as a core material, an optical fiber core, and/or a protrusive phase matrix material. Cladding 104 may be alternatively referred to herein as a cladding material, an optical fiber cladding, and/or a recessive phase matrix material. FIG. 1A shows core 106 as having a circular cross-section. However, in other implementations, core 106 may have, for example, an elliptical cross-section or an n-gonal (e.g., hexagonal, octagonal, etc.) cross-section. Similarly, FIG. 1A shows the outside of cladding 104 as having a hexagonal cross-section. However, in other implementations, cladding 104 may have, for example, a circular cross-section, an elliptical cross-section, or another n-gonal (e.g., square, octagonal, decagonal, etc.) cross section.

The cladding of the plurality of glass fibers that forms glass fiber array 100 may collectively define and/or be referred to as a support structure of glass fiber array 100. That is, when the plurality of glass fibers in glass fiber array 100 is fused together, the support structure may be defined by the union of the cladding of the plurality of glass fibers. The support structure may include and/or define therein a plurality of substantially parallel cores, cavities, and/or voids through which the cores of glass fiber array 100 extend.

Glass fiber array 100 may be formed by bundling the plurality of glass fibers with their axes aligned side by side. Glass fiber axis 110 running through the core of glass fiber 112 illustrates the axial direction of glass fiber 112. The bundle of the plurality of glass fibers may be stretched axially (i.e., along axis 110) while being heated, resulting in the cladding material of the plurality of glass fibers fusing together and the glass fibers having their respective diameters reduced and their length increased. The stretched bundle may then be cut perpendicularly to the glass fiber axes (i.e., perpendicularly to axis 110). The process may be repeated with respect to the stretched and cut glass fiber bundle until the individual glass fibers reach a desired size (e.g., a desired diameter of core 106, a desired length of glass fiber 102, etc.) and/or the bundle reaches a desired size (e.g., the surface area of face 108 reaches a threshold surface area). With each iteration of bundling, stretching, and cutting, the diameter of the glass fibers may be reduced and the length may be increased, but an aspect ratio of core 106 to cladding 104 (e.g., core 106 radius to cladding 104 radius) may remain substantially constant.

Figure 1B:
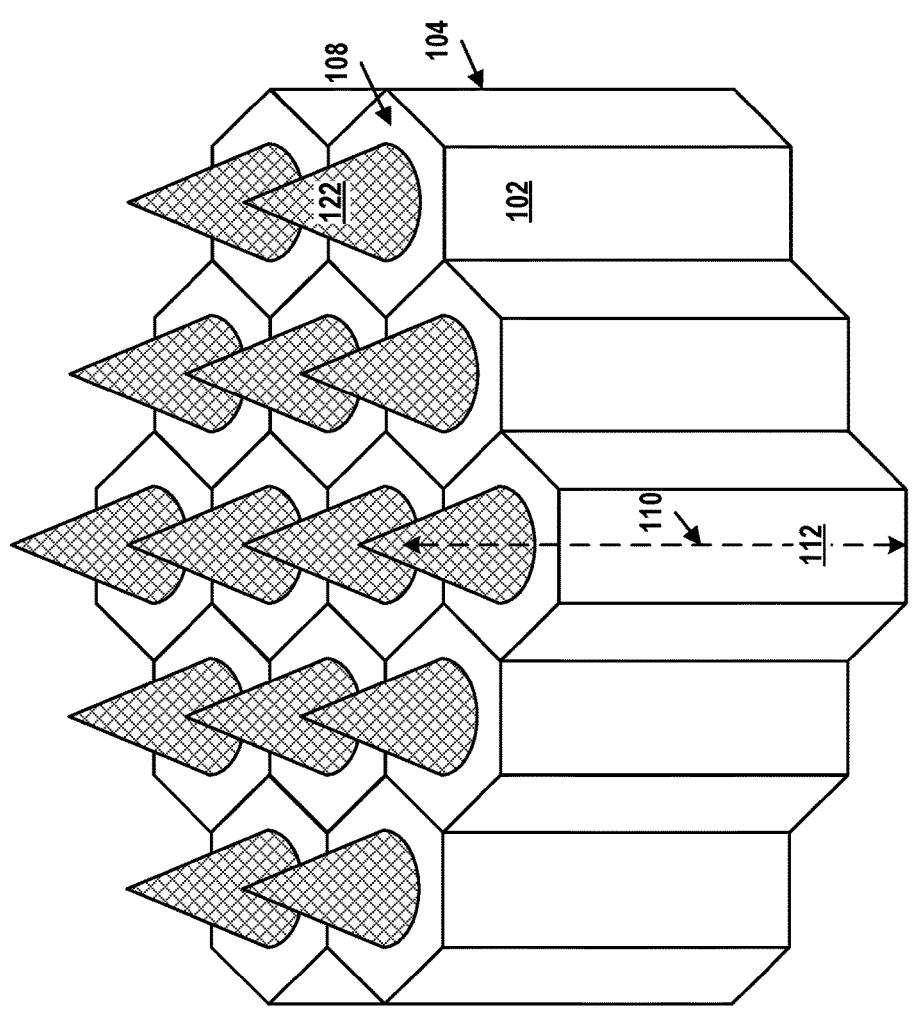
FIG. 1B illustrates a spike array, in accordance with example embodiments.

When glass fiber array 100 and/or the fibers therein achieve a desired size, at least one face of glass fiber array 100 may be etched to create an array of conically-shaped spikes. For example, face 108, which is perpendicular to the axes of the glass fibers (e.g., axis 110), may be etched, resulting in formation of spike array 120, as illustrated in FIG. 1B. Spike array 120 may include a plurality of conically-shaped spikes protruding from face and/or side 108. Each respective spike of spike array 120 may include a portion of a corresponding core radially surrounded by corresponding cladding and a corresponding axial protrusion (formed from the core) that, due to the etching, is no longer radially surrounded by the corresponding cladding. The axial protrusion may be tapered and thus define and/or include the conically-shaped end of the spike. In some embodiments, the axial protrusion may be substantially conical and may have a radius defined by a radius of the core.

Specifically, taking spike 122 as a representative example, the materials of core 106 and cladding 104 may be selected to have different etching rates when subjected to a particular etchant. An etching rate of cladding 104 may be greater than an etching rate of core 106. Thus, as face 108 of glass fiber array 100 is exposed to the etchant, cladding 104 may be removed at a higher rate than core 106, resulting in core 106 being shaped into a substantially conical spike. Thus, glass fiber 102 may be etched to form conically-shaped spike 122. Spike 122 may include a portion of core 106 that, after etching, remains surrounded by cladding 104 and thus connects, mounts, and/or attaches spike 122 to the support structure. Spike 122 may also include an axial protrusion defined by etching core 106 to form a substantially-conical shape. Because the axial protrusion begins to form due in part to cladding 104 being etched away, the axial protrusion might not be surrounded by any cladding material.

The aspect ratio of spike 122 (e.g., the ratio of the height of the cone protruding from face 108 to a radius of the cone) may be based on an etching rate ratio of the etching rate of cladding 104 to the etching rate of core 106. For example, as the etching rate ratio is decreased, spike 122 may become flattened (i.e., height/radius may decrease), and as the etching rate ratio is increased, spike 122 may become more pointy (i.e., height/radius may increase). In one example, aspect ratios of 0.3 height-to-base to 30 height-to-base may be achieved, although smaller and/or larger height-to-base ratios may be achievable as well. Thus, the aspect ratio of the spikes may be controlled through selection of a particular combination of the cladding material, the core material, and/or the etchant. In some cases, the resulting plurality of conically-shaped spikes may be atomically-sharp. That is, the tip of each cone may be defined by a single atom and/or molecule of the core material.

Within examples, the etchant may include: organic acids, inorganic acids (e.g., HF, HCl, HBr, or HI), organic alkalis, inorganic alkalis, polar solvents, nonpolar solvents, organic solvents, inorganic solvents, and/or mixtures of any of the foregoing. For example, dilute HF (e.g., 5%) and/or a buffered HF may be used to vary the differential etch rate and thus the aspect ratio of the conically-shaped spikes. The etchant can be a mixed etchant system that includes a mixture of a plurality of etchants that give different etch contrast ratios when applied to glass fiber array 100. For example, one etchant can preferentially etch core 106 while the other etchant can preferentially etch cladding 104. A mixed etchant system may allow for modification of the contrast ratio of the etching process by changing the composition and/or relative concentrations of the etchants. An example of a mixed etchant system is a mixture of HF and HCl.

III. Example Array of Metal-Coated Conically-Shaped Spikes

Spike array 120 may be coated with a layer of a refractory metal, and may thus be used in various applications as an electron emitter. Specifically, due to their "sharpness" (i.e., low radius of curvature), the metal-coated spikes of spike array 120 may allow high electric fields to exist near the tips of the spikes, thus allowing for emission of electrons at relatively low voltages. The refractory metal used to coat spike array 120 may include Niobium (Nb), Molybdenum (Mo), Tantalum (Ta), Tungsten (W), and/or Rhenium (Re). Refractory metals may be used due to being more resistant to degradation over the course of use for electron emission than non-refractory metals.

FIG. 2 illustrates spike array 120 coated with a refractory metal layer. The metal-coated version of spike array 120 illustrated in FIG. 2 may be referred to as metal-coated spike array 200. View 250 shows a cross-section of metal-coated spike array 200 taken as shown by line 208. Specifically, view 250 shows a cross-section through spikes 202, 204, and 206 (i.e., spikes 202-206), which are discussed as a representative example of the plurality of spikes in metal-coated spike array 200.

Each of the plurality of spikes that forms metal-coated spike array 200 may be coated by layer 230 of the refractory metal, as illustrated by the darkened coloring of the axial protrusions and the cladding faces therebetween. Thus, each of spikes 202, 204, and 206 is shown in view 250 as being coated by a corresponding refractory metal region 212, 214, and 216, respectively, of refractory metal layer 230. Refractory metal layer 230 may be continuous across the plurality of spikes in metal-coated spike array 200, resulting in the plurality of spikes being electrically connected to one another. Thus, refractory metal regions 212, 214, and 216 may be physically continuous and electrically connected to one another due to the fact that refractory metal layer 230 coats the entirety of a first side of metal-coated spike array 200. Refractory metal layer 230 may be deposited on spike array 120 to form metal-coated spike array 200 via electroplating, sputtering, electron beam physical vapor deposition, and/or chemical vapor deposition, among other possible metal deposition techniques.

Metal-coated spike array 200 may include electrodes 222 and 226 configured to apply a voltage to refractory metal layer 230. Electrodes 222 and 226 may include traces, leads, wires, and/or other conductive structures connected to refractory metal layer 230. Electrodes 222 and 226 may be positioned along an outside of the support structure of metal-coated spike array 200, as illustrated in FIG. 2. In other implementations, electrodes 222 and 226 may be physically separated from the support structure. In some cases, electrodes 222 and 226 (and/or the other electrodes discussed herein) may, collectively with metal layer 230 (and/or the other metal layers discussed herein), define a cathode from which electrons are emitted towards an anode.

Electrodes 222 and 226 may provide a way for one or more voltage sources to be connected to refractory metal layer 230. Specifically, because electrodes 222 and 226 run from the first side (having the spikes protruding therefrom) of metal-coated spike array 200 to a second side thereof, the one or more voltage sources may be positioned and/or connected at the second side, thereby allowing the first side to remain unobstructed. Since metal layer 230 is physically and electrically continuous, the voltage applied at electrodes 22 and/or 226 may be applied uniformly to all spikes.

FIG. 3 illustrates an alternative way of coating spike array 120 with a refractory metal layer. The metal-coated version of spike array 120 illustrated in FIG. 3 may be referred to as metal-coated spike array 300. View 350 shows a cross-section of metal-coated spike array 300 taken as shown by line 308. Specifically, view 350 shows a cross-section through spikes 302, 304, and 306 (i.e., spikes 302-306), which are discussed as a representative example of the plurality of spikes in metal-coated spike array 300.

Each of the plurality of spikes that forms metal-coated spike array 300 may be coated by layer 330 of the refractory metal, as illustrated by the darkened coloring of the axial protrusions. Thus, each of spikes 302, 304, and 306 is shown in view 350 as being coated by a corresponding refractory metal region 312, 314, and 316, respectively, of refractory metal layer 330. Unlike refractory metal layer 230 in FIG. 2, refractory metal layer 330 may be discontinuous across the plurality of spikes, resulting in the plurality of spikes being electrically isolated from one another. Thus, each of refractory metal regions 312, 314, and 316 may be physically separated from one another and may be electrically isolated from one another due to the fact that refractory metal layer 330 does not coat the entirety of the first side of metal-coated spike array 300. Specifically, refractory metal layer 330 coats the axial protrusions of metal-coated spike array 300, but does not coat the faces of the cladding material on the first side of metal-coated spike array 300.

The discontinuity in refractory metal layer 330 may be achieved via selective deposition of the refractory metal on the axial protrusion, but not on the cladding material. In one example, this selectivity may be achieved on the basis of differences in material properties of the core material and the cladding material. For example, the core material may be conductive, and the refractory metal layer may be deposited (e.g., via electroplating) on the axial protrusions by applying a voltage to the axial protrusions, but not to the nonconductive cladding material. In another example, the selective deposition of the refractory metal on the axial protrusions may be achieved by protecting the cladding material (e.g., with a mask or coating) prior to metal deposition while leaving the core material exposed, and subsequently removing the protective material once the refractory metal layer has been deposited. Other techniques may also be used to selectively form refractory metal layer 330 on the axial protrusions.

Metal-coated spike array 300 may include a corresponding electrode for each of the spikes in metal-coated spike array 300, thus allowing the voltage of each respective spike to be controllable independently of the other spikes. Specifically, metal-coated spike array 300 may utilize a conductive core material (e.g., metal-impregnated glass), thus allowing each of the cores to function as an electrode. Specifically, conductive core 322 may operate as an electrode for spike 302, conductive core 324 may operate as an electrode for spike 304, and conductive core 326 may operate as an electrode for spike 306. The cladding material of the support structure may be electrically insulating, thus allowing for independent control of each individual metal-coated spike. For example, a first voltage may be applied to spike 304 (and thus refractory metal region 312) while a second (different) voltage is applied to spike 304 and/or a third (yet still different) voltage is applied to spike 306. Because electrodes 322, 324, and 326 run from the first side of metal-coated spike array 300 to the second side thereof, the one or more voltage sources may be positioned or connected at the second side, thereby allowing the first side to remain unobstructed.

In some implementations, two or more adjacent spikes (e.g., 4 adjacent spikes) of the plurality of spikes in metal-coated spike array 300 may define an electrically connected spike group. Specifically, the respective portions of refractory metal layer 330 associated with the two or more spikes in the spike group may be continuous across the two or more spikes (e.g., as shown in FIG. 2). However, different groups of spikes may remain electrically isolated from one another. Thus, in some cases, the voltage applied to a particular spike group may be controllable independently of one or more voltages applied to one or more other spike groups.

FIG. 4 illustrates another alternative for coating spike array 120 with a refractory metal layer and for routing the electrodes to the refractory metal layer. The metal-coated version of spike array 120 illustrated in FIG. 4 may be referred to as metal-coated spike array 400. View 450 shows a cross-section of metal-coated spike array 400 taken as shown by line 408. Specifically, view 450 shows a cross-section through spikes 402, 404, and 406 (i.e., spikes 402-406), which are discussed as a representative example of the plurality of spikes in metal-coated spike array 400.

Each of the plurality of spikes that forms metal-coated spike array 400 may be coated by layer 430 of the refractory metal, as illustrated by the darkened coloring of respective portions of the axial protrusions. Thus, each of spikes 402, 404, and 406 is shown in view 450 as being partially coated by a corresponding refractory metal region 412, 414, and 416, respectively, of refractory metal layer 430. Like refractory metal layer 330 in FIG. 3, refractory metal layer 430 may be discontinuous across the plurality of spikes, resulting in the plurality of spikes in metal-coated spike array 400 being electrically isolated from one another. Thus, each of refractory metal regions 412, 414, and 416 may be physically separated from one another and may be electrically isolated from one another due to the fact that refractory metal layer 430 does not coat the entirety of the first side of metal-coated spike array 400. In some cases, spikes in metal-coated spike array 400 may be organized into groups of two or more electrically connected spikes.

Unlike refractory metal layer 330 in FIG. 3, refractory metal layer 430 may coat only a first (top) portion the respective axial protrusion of each spike, resulting in a second (bottom) portion of the respective axial protrusion of each spike being exposed at the first side. Such coating may be achieved, for example, by protecting the cladding material and the second portion of the axial protrusion, but not the first portion of the axial protrusion, prior to metal deposition, and subsequently removing the protective material once the refractory metal layer has been deposited. In another example, such coating may be achieved by submerging only the first portions of the axial protrusions in a chemical bath to carry out the metallization. The second portions of the axial protrusions may correspond to a buffer distance between the support structure and the chemical bath maintained at the time of metallization to avoid forming a continuous metal coat across the first side of metal-coated spike array 400. Other techniques may also be used to selectively form refractory metal layer 430 on the first portions of the axial protrusions.

Metal-coated spike array 400 may include a corresponding electrode for each of the spikes in metal-coated spike array 400, thus allowing the voltage of each respective spike to be controllable independently of other spikes. Specifically, metal-coated spike array 400 may utilize electrodes that run through the core material. For example, spike 402 may be connected to electrode 422, spike 404 may be connected to electrode 424, and spike 406 may be connected to electrode 426. The cladding material of the support structure and/or the core material may be electrically insulating, thus allowing for independent control of each individual metal-coated spike.

Each of electrodes 422, 424, and/or 426 may include conductive material (e.g., metal) extending through the core of the corresponding spike. In one example, in order to allow for formation of such in-core electrodes, each core may include at least two different core materials. Specifically, an inner core may be made out of a first material and an outer core surrounding the inner core may be made out of a second material. After formation of refractory metal layer 430, the inner core may be selectively etched out while the outer core remains intact. The void left after etching out the inner core may then be metallized, thus forming the electrodes.

In another example, metal layer 430 may entirely cover each axial protrusion and a portion of the cladding material on the first side of the support structure, such that metal layer 430 is bonded to the support structure while forming a discontinuous coat thereon to allow for independent control of individual spikes. After formation of refractory metal layer 430, the entirety of the core (rather than only a portion thereof) may be selectively etched out while the cladding remains intact. The void left after etching out the core may then be metallized, thus forming the electrodes by replacing the core material with metal.

In general, aspects of metal-coated spike arrays 200, 300, and/or 400 may be combined to form different variations thereof. In one example, the continuous refractory metal layer of array 200 may be used in combination with the electrodes of arrays 300 or 400. In another example, the partially-coated spikes of array 400 may be used in combination with the electrodes of array 300. In a further example, the spikes of spike arrays 200, 200, and/or 400 may be divided into groups, each including two or more spikes. The refractory metal layer may be continuous with respect to the spikes within a particular group (e.g., as in array 200), but may be discontinuous with respect to different groups (e.g., as in arrays 300 and/or 400). Thus, the voltage may be independently controllable with respect to different groups of spikes, but spikes within a particular group may have the same voltage applied thereto. Other variations are possible, and the different aspects of arrays 200, 300, and/or 400 may be viewed as being interchangeable, with the particular combinations illustrated in FIGS. 2, 3, and/or 4 being provided for illustrative purposes.

Each metal-coated spike of arrays 200, 300, and/or 400 may, due to its shape, be used as an electron emitter. Specifically, due to its "sharpness" (i.e., low radius of curvature), each metal-coated spike may accumulate a relatively high charge density at its tip, resulting in a high electric field at the tip, and thus allow for emission of electrons from the tip. Emission of electrons may be achieved by applying a voltage between, for example, the spike and one or more anodes, and/or the spike and a sample. Increasing the sharpness of the spike may allow for electron emission at lower voltages.

In some cases, each spike of spike array 120 may be atomically sharp. When spikes of spike array 120 are coated with the refractory metal, the radius of curvature of each spike may be substantially equal to a thickness of the refractory metal layer. That is, due to the atomic sharpness of spikes in spike array 120, the thickness of the refractory metal layer may be used to control the radius of curvature of each spike. As the thickness is increased, the durability and/or expected lifespan of the refractory metal layer may be improved while the voltage associated with electron emission may be increased. Thus, the voltage associated with electron emission may be decreased (at the expense of the durability and/or expected lifespan of the refractory metal) by decreasing the thickness of the refractory metal layer.

Further, spike array 120 may be coated with the refractory metal to form array 200, 300, and/or 400 because metal coating processes may be compatible with the materials used to form spike array 120. On the other hand, due to the material properties of the refractory metals, replacing the core material with the refractory metal (prior to formation of array 100 and/or 120) and forming the conically-shaped spikes entirely out of the refractory metal might not be feasible. For example, the temperatures and/or forces associated with drawing a refractory metal core might exceed those with which the cladding is compatible, resulting in damage to and/or destruction of the cladding.

While the drawing conditions of some non-refractory metals may be compatible with the cladding material, these non-refractory metals might not be as desirable as the refractory metals in the context of electron emission. Specifically, non-refractory metals may exhibit greater degradation under electron emission than refractory metals. The nonmetallic (e.g., glass-based) core and cladding materials may generally be drawn using approximately similar temperatures and forces, and the refractory metal layer may be deposited thereon using processes that do not damage the fiber array. Thus, by coating spike array 120 with the refractory metal layer, an electron emitter may be achieved that has a low radius of curvature and is resistant to degradation over the course of use for electron emission.

IV. Example Field Emission Electron Microscopy System

Figure 5:
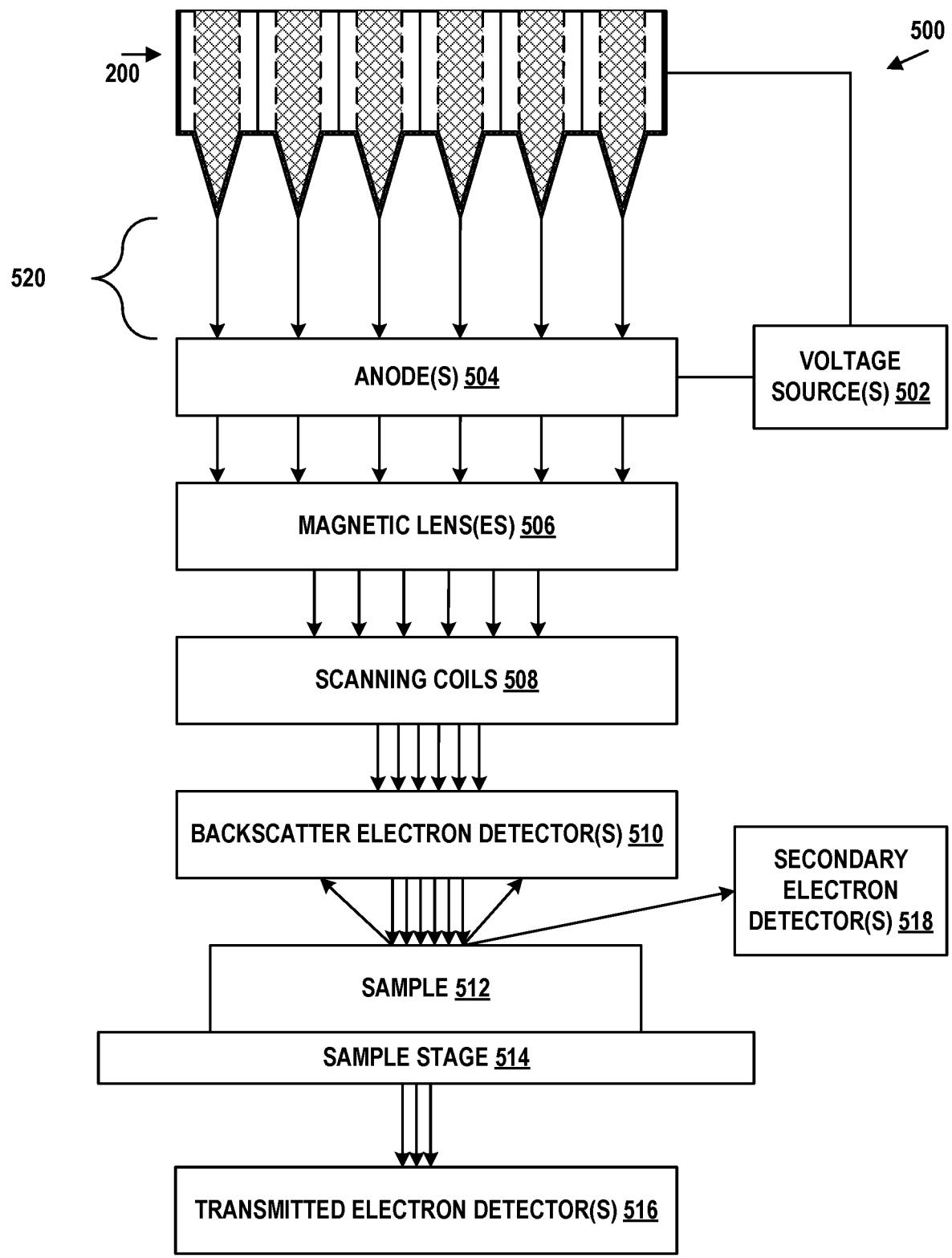
FIG. 5 illustrates a field emission electron microscope system, in accordance with example embodiments.

FIG. 5 illustrates field emission electron microscope system 500. Field emission microscope system 500 includes metal-coated spike array 200 operating as a field emission tip, anode(s) 504, voltage source(s) 502, magnetic lens(es) 506, scanning coils 508, backscatter electron detector(s) 510, sample stage 514, transmitted electron detector(s) 516, and secondary electron detector(s) 518. Field emission electron microscope system 500 may be configured to determine one or more physical properties of sample 512 by emitting electrons at sample 512 and observing how these electrons are reflected, scattered, absorbed, and/or transmitted by sample 512, and/or by observing any electromagnetic radiation emitted as a result of interaction between the electrons and the sample. Thus, field emission electron microscope system 500 may represent a transmission electron microscope, a scanning electron microscope, a reflection electron microscope, and/or a combination of aspects thereof.

Voltage source(s) 502 may be configured to apply a voltage between anode(s) 504 and refractory metal layer 230 of spike array 200 (e.g., by way of electrodes 222 and/or 226) to induce emission of electrons from the spikes of spike array 200, as indicated by lines 520 projected therefrom. Voltage source(s) 502 may include more or more voltage regulators and/or controllers. Anode(s) 504 may be positioned relative to spike array 200 to control a direction in which the electrons are emitted. Each of anode(s) 504, magnetic lens(es) 506, scanning coils 508, and backscatter electron detector(s) 510 may provide respective apertures that allows for the electrons to reach sample 512.

In some implementations, metal-coated spike array 200 may be replaced by array 300, array 400, and/or a metal-coated spike array that includes a combination of aspects of arrays 200, 300, and/or 400. Thus, in some cases, one or more portions of the field emission tip may be independently controllable by voltage source(s) 502, allowing voltage source(s) 502 to control the spatial density of the emitted electrons. By using an array of field emission tips, rather than a single field emission tip, as little as a few electrons emitted per spike may be sufficient to generate a target electron current, thus further increasing the expected lifetime of the field emission tips.

Magnetic lens(es) 506 may include, for example, one or more electromagnets configured to focus the electrons into an electron beam that is projected onto sample 512, as indicated by the decreasing spacing between lines 520 as the lines get closer to sample 512. Magnetic lens(es) 506 may include one or more of a condenser lens, an objective aperture lens, an intermediate lens, and/or a projector lens, among other possibilities. Scanning coils 508 may be configured to deflect and direct the electron beam relative to sample 512, thus allowing for scanning of the electron beam over the surface of sample 512. Sample stage 514 may provide a substrate on which sample 512 is placed during imaging. In some implementations, sample stage 514 may be configured to reposition sample 512 relative to other components of field emission microscope system 500.

Backscatter electron detector(s) 510 may be configured to detect one or more electrons reflected and/or scattered by sample 512 back toward the field emission tip with a first predetermined range of angles. Secondary electron detector(s) 518 may be configured to detect one or more electrons reflected and/or scattered sideways by sample 512 with a second predetermined range of angles. Transmitted electron detector(s) 516 may be configured to detect one or more electrons transmitted through sample 512. Thus, backscatter electron detector(s) 510, secondary electron detector(s) 518, and transmitted electron detector(s) 516 may each be configured to detect one or more of the electrons emitted by the field emission tip after these electrons interact with sample 512.

Backscatter electron detector(s) 510, secondary electron detector(s) 518, and transmitted electron detector(s) 516 may differ in their positioning relative to sample 512 and thus provide information about different physical properties of sample 512. In some implementations, one or more of backscatter electron detector(s) 510, secondary electron detector(s) 518, and/or transmitted electron detector(s) 516 may be omitted. Further, in some cases, field emission electron microscope system 500 may additionally include one or more electromagnetic radiation sensors (e.g., X-Ray sensors) configured to detect electromagnetic radiation emitted by sample 512 in response to one or more electrons interacting with sample 512. A computing device may be configured to determine one or more physical properties of sample 512 based on data generated by the electron detectors and/or the electromagnetic radiation detectors.

V. Example Electron Tunneling Microscopy System

Figure 6:
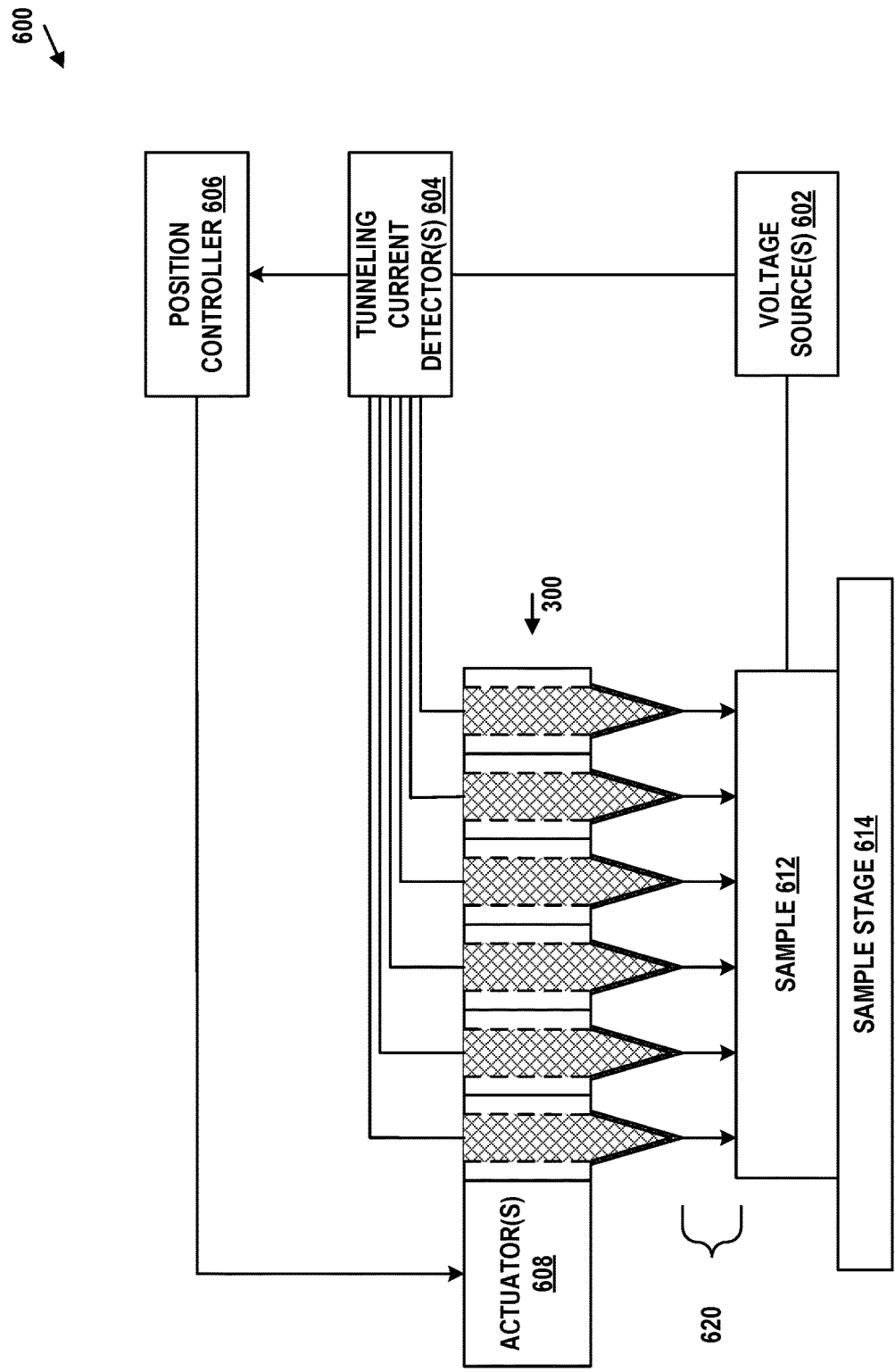
FIG. 6 illustrates an electron tunneling microscope system, in accordance with example embodiments.

FIG. 6 illustrates electron tunneling microscope system 600. Electron tunneling microscope system 600 includes metal-coated spike array 300 operating as an array of probes configured to provide for tunneling of electrons, voltage source(s) 602, tunneling current detector(s) 604, position controller 606, actuator(s) 608, and sample stage 614. Electron tunneling microscope system 600 may be configured to determine one or more physical properties of sample 612 by positioning the array of probes within a threshold distance of sample 612 while applying a voltage therebetween, emitting electrons from the array of probes toward sample 612 via electron tunneling, and measuring the tunneling current at each spike in the array of probes.

In some implementations, metal-coated spike array 300 may be replaced by array 400 and/or a metal-coated spike array that includes a combination of aspects of arrays 200, 300, and/or 400 and provides for independent voltage control and/or current measurement at each spike or group of spikes in the array.

Voltage source(s) 602 may be configured to apply a voltage between sample 612 and the refractory metal layer of spike array 300 to induce emission of electrons from the spikes of spike array 300, as indicated by lines 620 projected therefrom. Voltage source(s) 602 may include, for each spike or group of spikes in array 300, a corresponding voltage source, regulator, and/or controller such that the voltage of each spike or group of spikes in array 300 is independently controllable. Similarly, tunneling current detector(s) 604 may include, for each spike or group of spikes in array 300, corresponding current detector (e.g., ammeter) such that a tunneling current at each spike or group of spikes is independently measurable. Specifically, the tunneling current may be inversely proportional to a distance between a point on a surface of sample 612 and a corresponding spike, and may be directly proportional to the voltage(s) applied by voltage source(s) 602. Thus, the distance may be determined based on the measured tunneling current and the voltage(s), among other parameters.

Position controller 606 may be configured to determine a position of at least one spike in array 300 relative to a point on sample 612 based at least on the tunneling currents measured by tunneling current detector(s) 604. Based on this position, position controller 606 may be configured to determine one or more adjustments to a horizontal and/or vertical position of array 300. Position controller 606 may provide instructions to actuator(s) 608 to reposition array 300 vertically and/or horizontally relative to sample 612. Thus, position controller 606 and actuator 608 may operate to position array 300 at a vertical distance above sample 612 that allows for a tunneling current to be generated between array 300 and sample 612 and measured by tunneling current detector(s) 604.

Additionally, in implementations where array 300 spans a smaller surface area than that of a face of sample 612 under inspection, position controller 606 and actuator 608 may operate to reposition array 300 horizontally relative to sample 612 to sweep, scan, and/or image the entire face of sample 612. Notably, by using an array of probes, rather than a single probe, the process of imaging sample 612 may take less time. In implementations where array 300 spans a surface area greater than or equal to that of the face of sample 612, array 300 might not need to be repositioned horizontally relative to sample 612. That is, the face of sample 612 under inspection may be scanned and/or imaged in one shot by operating at least some of the spikes in parallel.

Further, in some implementations, electron tunneling microscope system 600 may include a plurality of arrays 300, each of which may be vertically repositionable independently of the other arrays of the plurality of arrays.

Actuator(s) 608 may thus include a plurality of actuators each controllable to position its corresponding spike array at a respective target vertical position. Thus, electron tunneling microscope system 600 may accommodate measurement of samples that have surface height variations greater than a maximum distance at which tunneling still takes place between sample 612 and the metal-coated spikes of array 300. Specifically, a first instance of array 300 may be positioned at a first height relative to a first portion of sample 612 while a second instance of array 300 may be positioned at a second (different) height relative to a second portion of sample 612.

VI. Example Field Emission Display System

Figure 7:
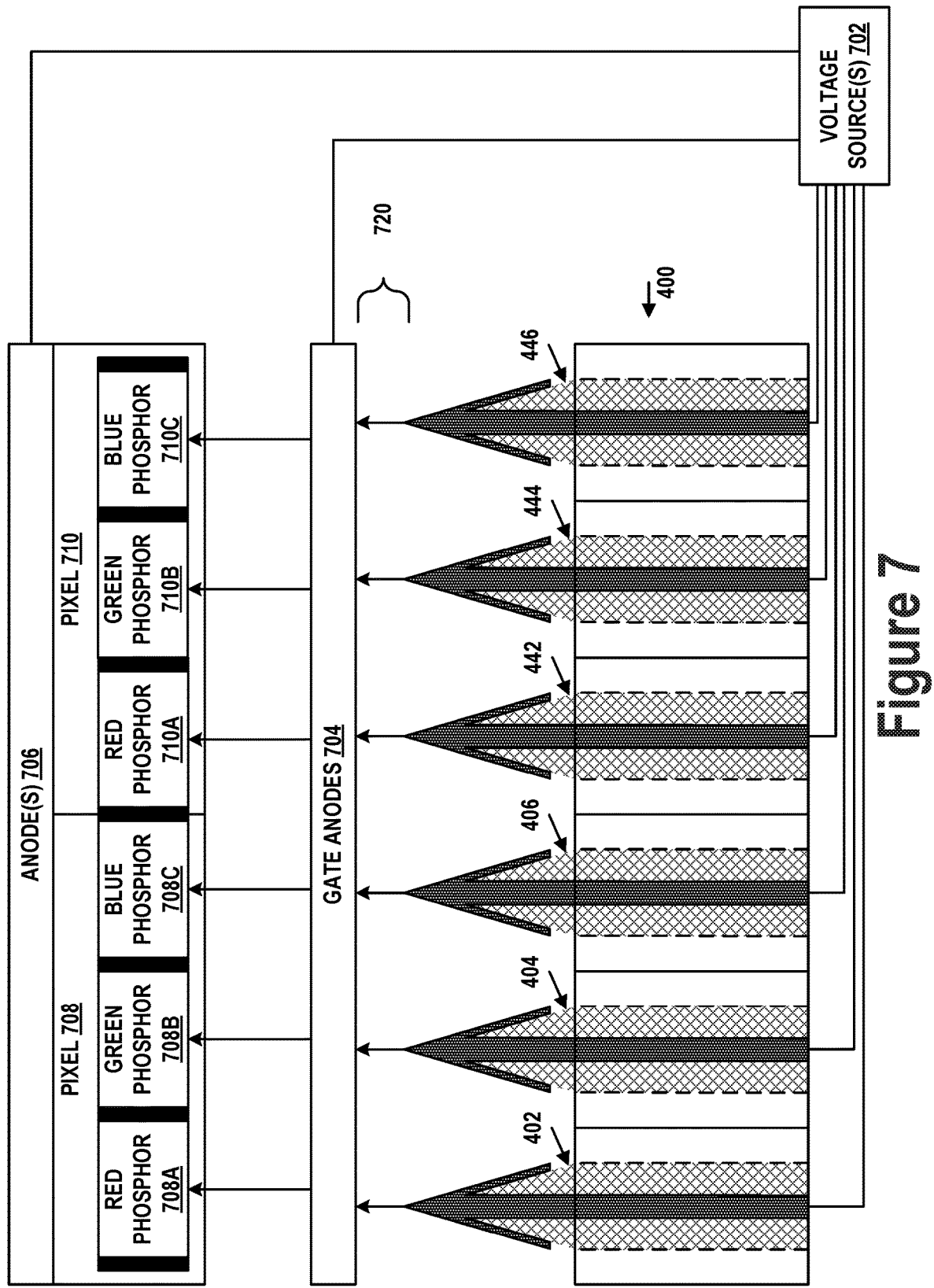
FIG. 7 illustrates a field emission display system, in accordance with example embodiments.

FIG. 7 illustrates field emission display system 700. Field emission display system 700 includes metal-coated spike array 400 operating as an array of independently-controllable field emission tips, voltage source(s) 702, gate anodes 704, anodes 706, and pixels 708 and 710. Field emission display system 700 may be configured to display one or more target images. In some implementations, metal-coated spike array 400 may be replaced by array 300 and/or a metal-coated spike array that includes a combination of aspects of arrays 200, 300, and/or 400 and provides for independent voltage control at each spike or group of spikes in the array.

Voltage source(s) 702 may be configured to apply respective voltages between gate anodes 704 and each of spikes 402, 404, 406, 442, 444, and 446 (i.e., spikes 402-446) to induce emission of electrons from spikes 402-446, as indicated by lines 720 projected therefrom. Each of gate anodes 704 may provide a corresponding aperture through which electrons may travel. Voltage source(s) 702 may also be configured to apply respective voltages between anode(s) 706 and each of spikes 402-446 to generate an electric field that at least partially controls the trajectories of the emitted electrons. Voltage source(s) 702 may include, for each spike or group of spikes in array 400, a corresponding voltage source, regulator, and/or controller such that the voltage of each spike or group of spikes in array 400 is independently controllable.

Pixels 708 and 710 may include red phosphors 708A and 710A, respectively, configured to emit red light in response to being struck by one or more electrons, green phosphors 708B and 710B, respectively, configured to emit green light in response to being struck by one or more electrons, and blue phosphors 708C and 710C, respectively, configured to emit blue light in response to being struck by one or more electrons. Thus, by applying a voltage between spike 402 and a corresponding gate anode of gate anodes 704, spike 402 may be caused to emit electrons which may strike red phosphor 708A, thereby causing pixel 708 to emit red light. Similarly, by applying a voltage between spike 404 and a corresponding gate anode of gate anodes 704, spike 404 may be caused to emit electrons which may strike green phosphor 708B, thereby causing pixel 708 to emit green light, and so on.

In some implementations, by controlling the voltage between spike 402 and one or more of anode(s) 706, spike 402 may be caused to emit electrons which may alternatively strike green phosphor 708B or another neighboring phosphor. Similarly, by controlling the voltage between spike 404 and one or more of anode(s) 706, spike 404 may be caused to emit electrons which may alternatively strike red phosphor 708A, blue phosphor 708C, or another neighboring phosphor. Thus, electrons emitted by a group of neighboring spikes may be directed towards one or more phosphors to increase the number of electrons incident on the one or more phosphors. Other variations may be possible. Accordingly, voltage source(s) 702 may be used to control a plurality of metal-coated spike arrays, gate anodes 704, and/or anode(s) 706 to cause the display system to display one or more target images.

VII. Additional Example Operations

FIG. 8 illustrates a flow chart of operations related to controlling an array of electron emission tips. The operations may be carried out by field emission electron microscope 500, electron tunneling microscope 600, and/or display system 700, among other possibilities. However, parts of the process can be carried out by other types of devices or device subsystems.

The embodiments of FIG. 8 may be simplified by the removal of any one or more of the features shown therein. Further, these embodiments may be combined with features, aspects, and/or implementations of any of the previous figures or otherwise described herein.

Block 800 may include applying, by one or more voltage sources, a voltage to an array of electron emission tips by way of one or more electrodes connected to a refractory metal layer of the array of electron emission tips. The array of electron emission tips may include a support structure that includes a cladding material and defines therein a plurality of substantially parallel cores. The array of electron emission tips may also include a plurality of conically-shaped spikes protruding from a first side of the support structure. Each respective conically-shaped spike of the plurality of conically-shaped spikes may include a core material (i) extending through a corresponding core of the plurality of substantially parallel cores and (ii) including an axial protrusion that protrudes axially from the cladding material at the first side of the support structure. The axial protrusion of the core material may be tapered to form the respective conically-shaped spike. The refractory metal layer may coat at least a portion of each respective conically-shaped spike.

Block 802 may include detecting, by an electron detector, electrons emitted by the array of electron emission tips.

In some embodiments, one or more physical properties of a sample may be determined based on the detecting of the electrons.

In some embodiments, the array of electron emission tips may include an array of electron emitters configured to emit the electrons. Applying the voltage to the refractory metal layer may induce emission of the electrons from the array of electron emitters. Detecting the electrons may include detecting at least one of (i) a scattering of the electrons by a sample after emission of the electrons from the array of electron emitters or (ii) a transmission of the electrons through the sample after emission of the electrons from the array of electron emitters. One or more physical properties of the sample may be determined based on the detecting of the electrons.

In some embodiments, the array of electron emitters, the one or more voltage sources, and/or the electron detector may form part of an electron field emission microscopy system.

In some embodiments, the array of electron emission tips may include an array of probes configured to provide for tunneling of the electrons between a sample and the array of probes. Applying the voltage to the refractory metal layer may induce tunneling of the electrons between the sample and the array of probes. The electron detector may include a plurality of electron detectors. Detecting the electrons may include measuring, for each respective probe in the array of probes, a corresponding tunneling current generated by the tunneling of the electrons between the sample and the respective probe. One or more physical properties of the sample may be determined based on the corresponding tunneling current measured for each respective probe.

In some embodiments, the array of probes, the one or more voltage sources, and/or the plurality of electron detectors may form part of an electron tunneling microscopy system.

In some embodiments, the array of electron emission tips may include an array of independently-controllable electron emitters configured to emit the electrons. The one or more voltage sources may be configured to apply the voltage to the refractory metal layer to induce emission of the electrons from the array of independently-controllable electron emitters. The electron detector may include an array of phosphors each configured to emit light in response to being struck by one or more of the electrons. Applying the voltage to the array of electron emission tips may include applying, to each independently-controllable electron emitter of the array of independently-controllable electron emitters, a respective voltage configured to cause the array of phosphors to display a target image.

In some embodiments, the independently-controllable electron emitters, the one or more voltage sources, and/or the array of phosphors may form part of an electron field emission display system.

In some embodiments, the cladding material may be electrically non-conductive. Each respective electrode of the one or more electrodes may be routed through the core material of a corresponding conically-shaped spike of the plurality of conically-shaped spikes.

In some embodiments, at least a portion of the core material may be electrically conductive and may include the one or more electrodes.

In some embodiments, the refractory metal layer may form a continuous coat across the plurality of conically-shaped spikes such that each respective conically-shaped spike is electrically connected to adjacent conically-shaped spikes of the plurality of conically-shaped spikes.

In some embodiments, the refractory metal layer may form a discontinuous coat across the plurality of conically-shaped spikes such that each respective conically-shaped spike is electrically isolated from at least one adjacent conically-shaped spike of the plurality of conically-shaped spikes.

In some embodiments, each respective conically-shaped spike may be electrically isolated from adjacent conically-shaped spikes of the plurality of conically-shaped spikes. The one or more electrodes may include a plurality of electrodes. Each respective electrode of the plurality of electrodes may be electrically connected to a corresponding conically-shaped spike of the plurality of conically-shaped spikes and may be configured to apply a respective voltage to the corresponding conically-shaped spike independently of the adjacent conically-shaped spikes.

In some embodiments, the refractory metal layer may coat the axial protrusion of each respective conically-shaped spike from a tip of the axial protrusion to a predetermined point along the axial protrusion.

In some embodiments, the refractory metal layer may include one or more of Niobium (Nb), Molybdenum (Mo), Tantalum (Ta), Tungsten (W), or Rhenium (Re).

In some embodiments, each respective conically-shaped spike may be atomically-sharp. A radius of curvature of the respective conically-shaped spike coated with the refractory metal layer may be substantially equal to a thickness of the refractory metal layer.

VIII. Conclusion

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. In the figures, similar symbols typically identify similar components, unless context dictates otherwise. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical operations or actions in the method or technique. The program code and/or related data may be stored on any type of computer readable medium such as a storage device including random access memory (RAM), a disk drive, a solid state drive, or another storage medium.

The computer readable medium may also include non-transitory computer readable media such as computer readable media that store data for short periods of time like register memory, processor cache, and RAM. The computer readable media may also include non-transitory computer readable media that store program code and/or data for longer periods of time. Thus, the computer readable media may include secondary or persistent long term storage, like read only memory (ROM), optical or magnetic disks, solid state drives, compact-disc read only memory (CD-ROM), for example. The computer readable media may also be any other volatile or non-volatile storage systems. A computer readable medium may be considered a computer readable storage medium, for example, or a tangible storage device.

Moreover, a step or block that represents one or more information transmissions may correspond to information transmissions between software and/or hardware modules in the same physical device. However, other information transmissions may be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. An article of manufacture comprising:
a support structure comprising a cladding material and defining therein a plurality of substantially parallel cores;
a plurality of conically-shaped spikes protruding from a first side of the support structure, wherein each respective conically-shaped spike of the plurality of conically-shaped spikes comprises a core material (i) extending through a corresponding core of the plurality of substantially parallel cores and (ii) comprising an axial protrusion that protrudes axially from the cladding material at the first side of the support structure, wherein the axial protrusion of the core material is tapered to form the respective conically-shaped spike;
a refractory metal layer coating at least a portion of each respective conically-shaped spike; and
one or more electrodes connected to the refractory metal layer and configured to apply a voltage to the refractory metal layer.

2. The article of manufacture of claim 1, wherein the cladding material is electrically non-conductive, and wherein each respective electrode of the one or more electrodes is routed through the core material of a corresponding conically-shaped spike of the plurality of conically-shaped spikes.

3. The article of manufacture of claim 2, wherein at least a portion of the core material is electrically conductive and comprises the one or more electrodes.

4. The article of manufacture of claim 1, wherein the refractory metal layer forms a continuous coat across the plurality of conically-shaped spikes such that each respective conically-shaped spike is electrically connected to adjacent conically-shaped spikes of the plurality of conically-shaped spikes.

5. The article of manufacture of claim 1, wherein the refractory metal layer forms a discontinuous coat across the plurality of conically-shaped spikes such that each respective conically-shaped spike is electrically isolated from at least one adjacent conically-shaped spike of the plurality of conically-shaped spikes.

6. The article of manufacture of claim 5, wherein each respective conically-shaped spike is electrically isolated from adjacent conically-shaped spikes of the plurality of conically-shaped spikes, wherein the one or more electrodes comprise a plurality of electrodes, and wherein each respective electrode of the plurality of electrodes is electrically connected to a corresponding conically-shaped spike of the plurality of conically-shaped spikes and configured to apply a respective voltage to the corresponding conically-shaped spike independently of the adjacent conically-shaped spikes.

7. The article of manufacture of claim 5, wherein the refractory metal layer coats the axial protrusion of each respective conically-shaped spike from a tip of the axial protrusion to a predetermined point along the axial protrusion.

8. The article of manufacture of claim 1, wherein the refractory metal layer comprises one or more of Niobium (Nb), Molybdenum (Mo), Tantalum (Ta), Tungsten (W), or Rhenium (Re).

9. The article of manufacture of claim 1, wherein each respective conically-shaped spike is atomically-sharp, and wherein a radius of curvature of the respective conically-shaped spike coated with the refractory metal layer is substantially equal to a thickness of the refractory metal layer.

10. The article of manufacture of claim 1, wherein the one or more electrodes are configured to apply the voltage to the refractory metal layer to induce emission of electrons from the plurality of conically-shaped spikes.

11. The article of manufacture of claim 1, wherein the one or more electrodes are configured to apply the voltage to the refractory metal layer to induce tunneling of electrons from a sample to the plurality of conically-shaped spikes.

12. A system comprising:
an array of electron emission tips comprising:
a support structure comprising a cladding material and defining therein a plurality of substantially parallel cores;
a plurality of conically-shaped spikes protruding from a first side of the support structure, wherein each respective conically-shaped spike of the plurality of conically-shaped spikes comprises a core material (i) extending through a corresponding core of the plurality of substantially parallel cores and (ii) comprising an axial protrusion that protrudes axially from the cladding material at the first side of the support structure, wherein the axial protrusion of the core material is tapered to form the respective conically-shaped spike; and
a refractory metal layer coating at least a portion of each respective conically-shaped spike;
one or more voltage sources connected to the refractory metal layer of the array of electron emission tips by way of one or more electrodes and configured to apply a voltage to the refractory metal layer; and
an electron detector configured to detect electrons emitted by the array of electron emission tips.

13. The system of claim 12, wherein the system is an electron field emission microscopy system, wherein the array of electron emission tips comprises an array of electron emitters configured to emit the electrons, wherein the one or more voltage sources are configured to apply the voltage to the refractory metal layer to induce emission of the electrons from the array of electron emitters, and wherein the electron detector is configured to detect the electrons by detecting at least one of (i) a scattering of the electrons by a sample after emission of the electrons from the array of electron emitters or (ii) a transmission of the electrons through the sample after emission of the electrons from the array of electron emitters.

14. The system of claim 12, wherein the system is an electron tunneling microscopy system, wherein the array of electron emission tips comprises an array of probes configured to provide for tunneling of the electrons between a sample and the array of probes, wherein the one or more voltage sources are configured to apply the voltage between the sample and the refractory metal layer to induce tunneling of the electrons between the sample and the array of probes, and wherein the electron detector comprises a plurality of electron detectors configured to detect the electrons by measuring, for each respective probe in the array of probes, a corresponding tunneling current generated by the tunneling of the electrons between the sample and the respective probe.

15. The system of claim 12, wherein the system is an electron field emission display system, wherein the array of electron emission tips comprises an array of independently-controllable electron emitters configured to emit the electrons, wherein the one or more voltage sources are configured to apply the voltage to the refractory metal layer to induce emission of the electrons from the array of independently-controllable electron emitters, and wherein the electron detector comprises an array of phosphors each configured to emit light in response to being struck by one or more of the electrons.

16. The system of claim 12, wherein the cladding material is electrically non-conductive, and wherein each respective electrode of the one or more electrodes is routed through the core material of a corresponding conically-shaped spike of the plurality of conically-shaped spikes.

17. A method comprising:
applying, by one or more voltage sources, a voltage to an array of electron emission tips by way of one or more electrodes connected to a refractory metal layer of the array of electron emission tips, wherein the array of electron emission tips comprises a support structure comprising a cladding material and defining therein a plurality of substantially parallel cores and a plurality of conically-shaped spikes protruding from a first side of the support structure, wherein each respective conically-shaped spike of the plurality of conically-shaped spikes comprises a core material (i) extending through a corresponding core of the plurality of substantially parallel cores and (ii) comprising an axial protrusion that protrudes axially from the cladding material at the first side of the support structure, wherein the axial protrusion of the core material is tapered to form the respective conically-shaped spike, and wherein the refractory metal layer coats at least a portion of each respective conically-shaped spike; and
detecting, by an electron detector, electrons emitted by the array of electron emission tips.

18. The method of claim 17, wherein the array of electron emission tips comprises an array of electron emitters configured to emit the electrons, wherein applying the voltage to the refractory metal layer induces emission of the electrons from the array of electron emitters, wherein detecting the electrons comprises detecting at least one of (i) a scattering of the electrons by a sample after emission of the electrons from the array of electron emitters or (ii) a transmission of the electrons through the sample after emission of the electrons from the array of electron emitters, and wherein the method further comprises:
determining one or more physical properties of the sample based on the detecting of the electrons.

19. The method of claim 17, wherein the array of electron emission tips comprises an array of probes configured to provide for tunneling of the electrons between a sample and the array of probes, wherein applying the voltage to the refractory metal layer induces tunneling of the electrons between the sample and the array of probes, wherein the electron detector comprises a plurality of electron detectors, wherein detecting the electrons comprises measuring, for each respective probe in the array of probes, a corresponding tunneling current generated by the tunneling of the electrons between the sample and the respective probe, and wherein the method further comprises:
determining one or more physical properties of the sample based on the corresponding tunneling current measured for each respective probe.

20. The method of claim 17, wherein the array of electron emission tips comprises an array of independently-controllable electron emitters configured to emit the electrons, wherein the one or more voltage sources are configured to apply the voltage to the refractory metal layer to induce emission of the electrons from the array of independently-controllable electron emitters, wherein the electron detector comprises an array of phosphors each configured to emit light in response to being struck by one or more of the electrons, and wherein applying the voltage to the array of electron emission tips comprises:
applying, to each independently-controllable electron emitter of the array of independently-controllable electron emitters, a respective voltage configured to cause the array of phosphors to display a target image.

* * * * *